United States Patent
Tippmann, Sr. et al.

(10) Patent No.: US 8,242,415 B2
(45) Date of Patent: Aug. 14, 2012

(54) PRODUCT WARMING APPARATUS

(75) Inventors: Vincent P. Tippmann, Sr., New Haven, IN (US); Joseph R. Tippmann, Rapid City, SD (US)

(73) Assignee: Thermodyne Food Service Products, Inc., Fort Wayne, IN (US)

( * ) Notice: Subject to any disclaimer, the term of this patent is extended or adjusted under 35 U.S.C. 154(b) by 772 days.

(21) Appl. No.: 12/216,713

(22) Filed: Jul. 9, 2008

(65) Prior Publication Data

US 2009/0014430 A1    Jan. 15, 2009

Related U.S. Application Data

(60) Provisional application No. 60/948,574, filed on Jul. 9, 2007.

(51) Int. Cl.
*F27D 11/00* (2006.01)
*F24D 3/08* (2006.01)

(52) U.S. Cl. ........ 219/433; 219/385; 219/386; 219/434; 219/486; 126/39 R; 236/32

(58) Field of Classification Search .......... 219/433, 219/385, 386, 434, 486; 126/39 R; 236/32
See application file for complete search history.

(56) References Cited

U.S. PATENT DOCUMENTS

| | | |
|---|---|---|
| 2,187,196 A | 1/1940 | Douglass |
| 2,259,519 A | 10/1941 | Ershler |
| 2,453,425 A | 11/1948 | Freed |
| 2,481,384 A | 9/1949 | Blackwell |
| 2,520,543 A | 8/1950 | Hawkins |
| 2,239,500 A | 4/1951 | Duke |
| 2,564,990 A | 8/1951 | Pamine |
| 2,583,118 A | 1/1952 | Porambo |
| 2,731,539 A | 1/1956 | Pavelka, Jr. |
| 3,038,058 A | 6/1962 | Gordon, Jr. |
| 3,356,085 A | 12/1967 | Johnson |
| 3,739,148 A | 6/1973 | Ryckman, Jr. |
| 3,805,018 A | 4/1974 | Luong et al. |
| RE28,292 E | 1/1975 | Piper et al. |

(Continued)

FOREIGN PATENT DOCUMENTS

DE    299 18 672 U1    10/1999

(Continued)

OTHER PUBLICATIONS

"Three-section Buffet & Warming Tray—Stainless-Steel Lids," Walmart Online Catalog, <http://www.walmart.com/catalog>, search performed Mar. 9, 2007.

*Primary Examiner* — Shawntina Fuqua
(74) *Attorney, Agent, or Firm* — Birch, Stewart, Kolasch & Birch, LLP

(57) ABSTRACT

A product warming apparatus with at least one product holding container having a bottom surface. An enclosure includes at least one opening configured to receive the product holding container. A heat radiating plate is provided in thermal communication with and configured to receive heat from a heating element. The heat radiating plate includes a top surface disposed adjacent the bottom surface of the product holding container with the top surface of the heat radiating plate being spaced apart from the bottom surface of the product holding container to define a gap therebetween. A thermostatic controller is in thermal communication with the heat radiating plate for controlling a flow of heat to the heat radiating plate.

17 Claims, 1 Drawing Sheet

U.S. PATENT DOCUMENTS

| | | |
|---|---|---|
| 3,974,358 A | 8/1976 | Goltsos |
| D272,978 S | 3/1984 | Gremponrez et al. |
| D290,083 S | 6/1987 | Dricken et al. |
| 4,784,054 A | 11/1988 | Karos et al. |
| 4,794,228 A | 12/1988 | Braun, Jr. |
| 5,203,257 A | 4/1993 | Goad |
| 5,900,173 A | 5/1999 | Robards, Jr. |
| 2004/0069766 A1* | 4/2004 | Haasis et al. ............ 219/433 |
| 2006/0272517 A1 | 12/2006 | Groll |
| 2007/0079822 A1 | 4/2007 | Pickens et al. |

FOREIGN PATENT DOCUMENTS

| | | |
|---|---|---|
| JP | 55-107838 | 7/1980 |
| JP | 60-40229 U | 3/1985 |
| JP | 8-206006 A | 8/1996 |
| JP | 2000-051096 A | 2/2000 |
| JP | 2006-149601 A | 6/2006 |

* cited by examiner

PRODUCT WARMING APPARATUS

CROSS-REFERENCE TO RELATED APPLICATIONS

The present application claims priority under 35 USC 119 to U.S. Provisional Patent Application No. 60/948,574 filed on Jul. 9, 2007 the entire contents of which are hereby incorporated by reference.

BACKGROUND OF THE INVENTION

1. Field of the Invention

This invention relates generally to a product or food warming apparatus and, more specifically, to a product or food warming apparatus of the type which may be used, for example, in restaurant or food buffets.

2. Description of Background Art

Hot product or food storage and warming devices are known in the art. Such devices are used, for example, in restaurant buffets, by catering services, in cafeterias, and other applications.

Various types or classes of product or food warming devices have been devised. In one such class, heat is transferred to one or more product or food storage containers by means of steam (so-called steam tables). Steam tables require a substantial pan which contains a quantity of water which is kept warm by means of a gas burner, electric heater, or other energy source. The water is heated to boiling or near boiling, and heat is transferred to containers which are suspended above the water. The heat is transferred by a combination of radiation, convection and conduction. The level of water must be maintained in order for the device to function properly. The volume of water used typically makes such devices heavy and cumbersome. They are also relatively expensive to construct and operate.

Another class of product or warming devices rely upon "dry" heat provided, for instance, by electrical coils or strip heaters. Such coils or heaters typically operate at a relatively high temperature, often at or above the temperature at which the coil or strip glows red (e.g., 800 degrees F., 427 degrees C.).

Cooking and/or heating a product or food is often done with gas or electric heating elements operating at relatively high temperatures (i.e., much higher than the temperatures at which a product or food cooks or is maintained). High temperatures are used primarily to speed the cooking process, as such temperatures are not necessary for actual cooking of the product or food. Many products or foods begin to cook at temperatures of approximately 140 degrees F., 60 degrees C., and will char or burn at the relatively high operating temperatures of electric coils and heating strips. Absent the use of pressurized containers or other special devices, product or foods containing a substantial amount of water cannot be heated above 212 degrees F., 100 degrees C. The use of extreme heat to cook and/or warm a product or food typically requires stirring, agitation or other mechanism to prevent the product or food closest to the extreme heat source from drying out, burning, charring, overcooking, sticking or other detrimental effect.

Product or food storage, holding, or warming devices should hold product or food within the range of 160 degrees F., 71 degrees C. (the temperature at which most products or food is pasteurized) and 140 degrees F., 60 degrees C. (the temperature at which many product or foods cook). While an ideal product or food warming apparatus might operate with a heat source which is heated to and maintained within this range, such apparatus are relatively expensive and may not be suitable for all applications. Thus, there exists a need for a relatively simple, non-cumbersome, inexpensive apparatus for maintaining a product or food in the desired temperature range for sustained periods, using a heat source that is "dry" and which does not operate at extreme temperatures.

SUMMARY AND OBJECTS OF THE INVENTION

In one embodiment, a product or food warming apparatus according to the present invention comprises at least one product or food holding container having a bottom surface, an enclosure having at least one opening configured to receive the product or food holding container, an electric heating element, and a heat radiating plate. The heat radiating plate is in thermal communication with, and receives heat from, the electric heating element. The plate has a top surface disposed adjacent the bottom surface of the product or food holding container. The top surface of the plate is spaced apart from the bottom surface of the container to define a gap therebetween. The apparatus further comprises a thermostatic controller which is in thermal communication with the heat radiating plate, and which controls a flow of electric current to the electric heating element.

In a particular embodiment, an area of the top surface of the heat radiating plate is substantially equal to or greater than an area of the bottom surface of the product or food holding container. In other embodiments, the plate 18 may have a smaller surface area relative to the product or food container 12. In this or other embodiments, the thermostatic controller controls the flow of electricity to the electric heating element so as to maintain the top surface of the plate at a temperature below 450 degrees Fahrenheit, 232 degrees Celsius. In a particular embodiment, the thermostatic controller controls the flow of electricity to the electric heating element so as to maintain the top surface of the plate in a temperature range of 100 degrees Fahrenheit, 38 degrees Celsius to 450 degrees Fahrenheit, 232 degrees Celsius.

In certain embodiments, the heat radiating plate is formed of a conductive material, such as steel or aluminum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
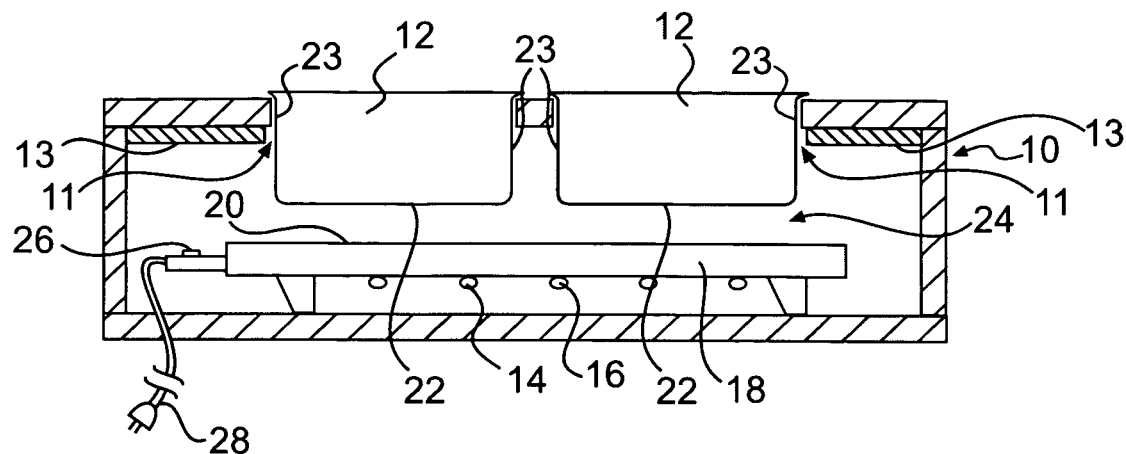
FIG. 1 shows a partial cross-sectional side view of one embodiment of a product or food warming apparatus constructed in accordance with the present invention.

FIG. 1 shows a partial cross-sectional side view of one embodiment of a product or food warming apparatus constructed in accordance with the present invention. With reference to FIG. 1, this illustrative embodiment includes an enclosure 10 having one or more openings 11 which receive, respectively, one or more product or food containers 12. The enclosure may be made of various materials, but will most likely be made of a "product or food friendly" material, such as stainless steel. Interior surfaces of the enclosure may also be provided with insulation over all or portions of its extent. This feature is schematically illustrated by insulation layer 13 which covers the under side of the top of enclosure 10.

Product or food containers 12 may be made of metal, plastic, glass, or other materials suitable for maintaining and serving hot product or food. Product or food containers 12 have bottom surfaces 22 which may be curved or may be substantially flat, or horizontal in the embodiment illustrated or may be of any shape, and side surfaces 23 which are substantially vertical. Lids (not shown) may be provided for one or more of product or food containers 12.

Inside enclosure 10 is a heat source 14. In this embodiment, heat source 14 is electrically powered, and has a heating element 16, such as a coil, adjacent the surface of a heat conducting/radiating plate 18. Plate 18 receives heat from heating element 16, and is sized and configured to evenly distribute that heat throughout its conductive body. Heat is radiated from a top surface 20 of plate 18 to the bottom surfaces 22 of containers 12. An air gap 24 is intentionally maintained between top surface 20 of plate 18 and bottom surfaces 22 of containers 12. The presence of air gap 24 and the enclosed space assures that the primary mode of heat transfer between heat source 14 and containers 12 is radiation, as opposed to conduction and/or convection. The horizontal and vertical orientations of bottom surfaces 22 and side surfaces 23, relative to top surface 20 of plate 18, also assures that most of the heat transferred by radiation from plate 18 will be transferred to bottom surfaces 22, and not to side surfaces 23, of containers 12.

A thermostatic controller 26 is provided, as illustratively shown. Thermostatic controller 26 is positioned so as to control the temperature of plate 18. Specifically, thermostatic controller 26 can be used to control the surface temperature of the top surface 20 of plate 18 by controlling the flow of electricity to the heating element 16.

Figure 2:
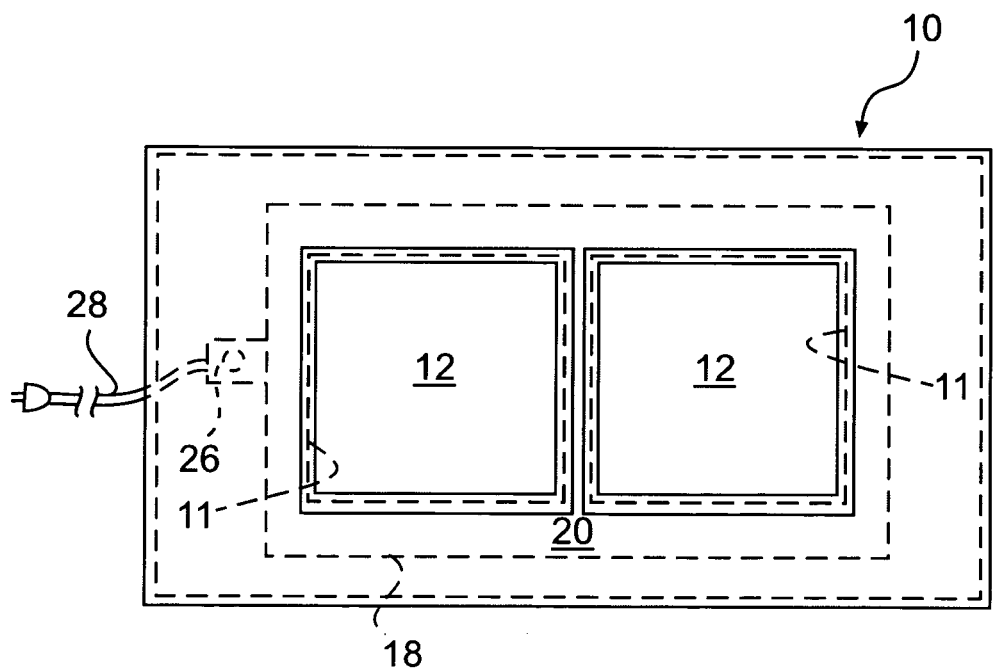
FIG. 2 shows a top view of the apparatus illustrated in FIG. 1.

FIG. 2 shows a top view of the warming apparatus of FIG. 1. Visible in FIG. 2 are enclosure 10 and product or food containers 12. Shown in dashed lines are openings 11 in enclosure 10 which receive containers 12. The peripheries of openings 11 support containers 12 around their respective peripheries, as illustrated.

Also shown by dashed lines in FIG. 2 is heat conducting plate 18. As illustrated, the overall size of heat conducting plate 18, including its top surface 20, is relatively large when compared to the bottom surfaces 22 of product or food containers 12. In other embodiments, the plate 18 may have a smaller surface area relative to the product or food container 12. This is significant in that, due to the relatively large surface area of plate 18, the temperature of top surface 20 can be maintained relatively lower (as compared to prior art "dry" product or food warming apparatus) while still transferring a sufficient amount of heat to bottom surfaces 22 of containers 12. The lower temperature, coupled with the even distribution of heat, improves the overall performance of the apparatus. Product or food is maintained at the desired temperature with a lower risk of scorching, burning, spot cooking/sticking, or other undesired occurrences.

Also shown in dashed lines in FIG. 2 is thermostatic controller 26 used to maintain top surface 20 of plate 18 at the desired temperature. An electrical cord 28 is illustrated as a means by which electric current is provided to thermostatic controller 26 and heating element 16. Other means for connecting element 16 and controller 26 to a source of power may be used.

In operation, electrical power is supplied through thermostatic controller to heating element 16, causing the temperature of plate 18 to rise. Plate 18 is formed of a conductive material and has sufficient thickness and mass so as to cause top surface 20 thereof to be maintained at a relatively uniform temperature. Because top surface 20 of plate 18 is a "dry" radiating surface, the temperature thereof can exceed 212 degrees Fahrenheit, 100 degrees Celsius, which is the maximum temperature that the surface of water can reach in a typical "wet" steam table warming apparatus. Due to the relatively large surface area of top surface 20, as compared to bottom surfaces 22 of containers 12, it is not necessary to heat the plate 18 to extreme temperatures (e.g., 750 degrees F., 399 degrees Celsius at which steel begins to glow red in the dark). Indeed, it will generally not be necessary to heat top surface 20 of plate 18 above a temperature of 450 degrees Fahrenheit, 232 degrees Celsius. In particular embodiments, it is anticipated that the temperature of top surface of the plate 18 will range from 100 degrees Fahrenheit, 38 degrees Celsius to 450 degrees Fahrenheit, 232 degrees Celsius.

Although the illustrated embodiment of FIGS. 1 and 2 shows the area of top surface 20 of plate 18 as being substantially larger than the bottom surfaces of containers 12, such is not required to achieve improvements over prior art devices. The heat radiated from top surface 20 of plate 18 and transferred to containers 12 is a function of the respective areas of top surface 20 and bottom surfaces 22 of containers 12. Accordingly, the larger surface area of top surface 20 has advantages in terms of reducing the surface temperature needed to maintain product or food in containers 12 in the desired range. However, the width of air gap 24 is also a factor, as are the respective materials from which plate 18 and containers 12 are formed. Varying these factors to achieve optimal results for specific products or foods under specific circumstances can be done. In one embodiment of the present invention, the area of top surface 20 of plate 18 is substantially equal to or greater than the combined bottom surfaces 22 of containers 12. By "substantially equal to" it is meant that the respective surface areas do not need to correspond exactly. That is, top surface 20 of plate 18 could be slightly smaller than the bottom surfaces 22 of containers 12, while still achieving the advantages of the invention. However, the present arrangement is distinguishable over those arrangements which use relatively small heating elements operating at relatively high temperatures. Avoidance of relatively high temperatures, which are considered to be temperatures in excess of 700 degrees Fahrenheit, 371 degrees Celsius, is advantageous.

As explained above, electrical power supplied through thermostatic controller to heating element 16 causes the temperature of the heat radiating plate 18 to rise. The heat radiating plate 18 is formed of a conductive material and has sufficient thickness and mass so as to cause the top surface 20 thereof to be maintained at a relatively uniform temperature. The bottom surfaces 22 of the containers 12 are spaced a predetermined distance from the top surface wherein a product or food is maintained at a constant temperature regardless of minor fluctuations in the temperature of the plate 18. More specifically, it is anticipated that the temperature of top surface of the plate 18 may be in the range of a first predetermined temperature from 100 degrees Fahrenheit, 38 degrees Celsius to 450 degrees Fahrenheit, 232 degrees Celsius while the temperature of the product or food within the container 12 will be maintained at a constant second predetermined temperature within a range below the preselected first predetermined temperature of the heat radiating plate 18.

It is to be noted that in some embodiments the plate 18 may have a smaller surface area relative to the product or food container 12.

Corresponding reference characters indicate corresponding parts throughout the several views. The exemplification set out herein illustrates an embodiment of the invention, in one form, and such exemplification is not to be construed as limiting the scope of the invention in any manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A product or food warming apparatus, comprising:
    at least one product or food holding container having a bottom surface;
    an enclosure having at least one opening configured to receive the product or food holding container;
    a substantially horizontal heat radiating plate, said substantially horizontal heat radiating plate being in thermal communication with and configured to receive heat from an electric heating element, and said substantially horizontal heat radiating plate having a top surface disposed adjacent the bottom surface of the product or food holding container, said top surface of the substantially horizontal heat radiating plate being spaced apart from the bottom surface of the container to define a gap therebetween, said substantially horizontal heat radiating plate only extending beneath substantially the entire bottom surface of the product or food holding container without any surface of said substantially horizontal heat radiating plate extending upwardly to be disposed adjacent to a side wall of the product or food holding container for enabling the heat to be transferred from the substantially horizontal heat radiating plate directly to heat the bottom surface of the product or food holding container and not the side surfaces to prevent a food product from sticking to the side surfaces; and
    a thermostatic controller in thermal communication with the heat radiating plate for controlling a flow of electric current to the electric heating element, wherein maintaining the substantially horizontal heat radiating plate at a first predetermined temperature enables a product or food disposed within the at least one product or food holding container to be maintained at a second predetermined temperature regardless of minor fluctuations in the first predetermined temperature of the substantially horizontal heat radiating plate.

2. The product or food warming apparatus according to claim 1, wherein the thermostatic controller controls the flow of electricity to the electric heating element so as to maintain the top surface of the substantially horizontal heat radiating plate at a temperature below 450 degrees F., 232 degrees C.

3. The product or food warming apparatus according to claim 1, wherein the thermostatic controller controls the flow of electricity to the electric heating element so as to maintain the top surface of the substantially horizontal heat radiating plate in a temperature range of 100 degrees F., 38 degrees C. to 450 degrees F., 232 degrees C.

4. The product or food warming apparatus according to claim 1, wherein the substantially horizontal heat radiating plate is formed of a heat radiating and conducting material selected from a group consisting of steel and aluminum.

5. The product or food warming apparatus according to claim 1, wherein the primary heat transferred between the substantially horizontal heat radiating plate and the bottom surface of the product or food holding container is radiant heat.

6. The product or food warming apparatus according to claim 1, and further including an insulating material disposed within said enclosure for retaining the heat therein.

7. The product or food warming apparatus according to claim 1, wherein the enclosure includes substantially vertical side walls and the bottom surface of the product or food holding container is a surface for ensuring that the majority of heat from the substantially horizontal heat radiating plate is transferred to the bottom surface of the product or food holding container and not to the side surfaces of the enclosure.

8. The product or food warming apparatus according to claim 1, wherein the substantially horizontal heat radiating plate produces a dry radiating surface with a temperature of at least 100 degrees F., 38 degrees C. for heating product or food disposed within the at least one product or food holding container.

9. A product warming apparatus, comprising:
    at least one product holding container having a bottom surface;
    an enclosure having a bottom member and upwardly projecting side walls with at least one opening configured to receive the product holding container; and
    a heat radiating plate, being positioned and spaced above the bottom member of the enclosure, said heat radiating plate being in thermal communication with and configured to receive heat from a heating element;
    wherein said heat radiating plate includes a top surface disposed adjacent to the bottom surface of the product holding container, said top surface of the heat radiating plate being spaced apart from the bottom surface of the container to define a gap therebetween, said heat radiating plate only extending beneath substantially the entire bottom surface of the product holding container and being spaced relative to the bottom member of the enclosure and being spaced relative to the upwardly projecting sid walls without any surface of said heat radiating plate extending upwardly to be disposed adjacent to a side wall of the product holding container for enabling the heat to be transferred from the heat radiating plate directly to heat the bottom surface of the product holding container and not the side surfaces of the product holding container to prevent a food product from sticking to the side surfaces.

10. The product warming apparatus according to claim 9, and further including a thermostatic controller for controlling the flow of electricity to the heating element so as to maintain the top surface of the plate at a temperature below 450 degrees F., 232 degrees C.

11. The product warming apparatus according to claim 9, and further including a thermostatice controller for controlling the flow of electricity to the heating element so as to maintain the top surface of the heating radiating plate in a temperature range of 100 degrees F., 38 degrees C to 450 degrees F., 232 degrees C.

12. The product warming apparatus according to claim 9, wherein the heat radiating plate is formed of a heat radiating and conducting material selected from a group consisting of steel and aluminum.

13. The product warming apparatus according to claim 9, wherein maintaining the heat radiating plate at a first predetermined temperature enables a product disposed within the at least one product holding container to be maintained at a second predetermined temperature regardless of minor fluctuations in the first predetermined temperature of the heat radiating plate.

14. The product warming apparatus according to claim 9, wherein the primary heat transferred between the heat radiating plate and the bottom surface of the product holding container is radiant heat.

15. The product warming apparatus according to claim 9, and further including a thermostatic controller in thermal communication with the heating element for controlling a flow of heat to the heat radiating plate.

16. The product warming apparatus according to claim 9, wherein the enclosure includes substantially vertical side walls and the heat radiating plate is a substantially horizontal surface and the bottom surface of the product holding container is a surface for ensuring that the majority of heat from the heat radiating plate is transferred to the bottom surface of the product holding container and not to the side surfaces of the enclosure.

17. The product warming apparatus according to claim 9, wherein the heat radiating plate produces a dry radiating surface with a temperature of at least 100 degrees F., 38 degrees C. for heating product disposed within the at least one product holding container.

\* \* \* \* \*